Dec. 7, 1943.    E. P. BULLARD, 3D., ET AL    2,336,163
INDICATOR
Filed March 6, 1940    2 Sheets-Sheet 1

INVENTORS
EDWARD P. BULLARD, III
PAUL H. LANGE
BY
Paul M. Geist
ATTORNEY

Dec. 7, 1943.    E. P. BULLARD, 3D., ET AL    2,336,163
INDICATOR
Filed March 6, 1940    2 Sheets-Sheet 2

INVENTORS
EDWARD P. BULLARD, III
PAUL H. LANGE
BY
Paul M. Geist
ATTORNEY

Patented Dec. 7, 1943

2,336,163

UNITED STATES PATENT OFFICE 2,336,163

INDICATOR

Edward P. Bullard, III, Fairfield, and Paul H. Lange, Bridgeport, Conn., assignors to The Bullard Company, a corporation of Connecticut Application March 6, 1940, Serial No. 322,558

11 Claims. (Cl. 116—124)

This invention relates to indicators and particularly to an indicator for a machine tool that will facilitate the latter's initial setting to perform a plurality of operations on a multiplicity of substantially identical work pieces.

Although the principles of this invention may be applied to any machine tool that is adapted to perform a plurality of working operations on a multiplicity of substantially identical work pieces, they will be shown and described as applied to a lathe having one or more tool-supporting heads adapted to be moved along rectilinear paths.

Heretofore, when it was desired to perform a metal-working operation with a machine tool equipped with an indicator of certain prior-known types, the tool was moved to a starting position relative to the work and the indicator dial, associated with the tool-moving means, indicated this position relative to a fixed datum. The reading of the indicator would be some value between zero and the number of divisions on the dial. Consequently, to move the tool a fixed amount from the starting point required the operator to locate the division on the dial that corresponded to the required distance of tool movement. To locate this point on the dial necessitated a computation involving the dial reading at the starting point and the distance the tool was to be moved. This computation became relatively difficult depending upon the direction and distance the tool was to be moved, required considerable time, and was a constant source of error. To overcome the above difficulties, adjustable dial indicators have been resorted to in the past. Although these adjustable dial indicators simplify the manufacture of a single work-piece, they are not adaptable to the manufacture of numerous work pieces on which a multiplicity of operations are to be performed because a setting once obtained is lost when a subsequent setting is required.

An object of this invention is to provide an indicator for a machine tool that will overcome the above and other difficulties encountered during the machining of duplicate work pieces on which a plurality of operations are to be performed.

Other objects of the invention include the provision of an indicator for a machine tool adapted to indicate any desired movement of the tool head, whether from a starting point or not, as a direct reading from zero; the provision of an indicator for a machine tool adapted accurately to fix the location of a plurality of positions of a tool head along a rectilinear path, and in which the distances between successive positions are always indicated as a direct reading from zero; the provision of an indicator for a machine tool including a micrometer dial for measuring, as a direct reading from zero, the distances between successive positions of a tool along a rectilinear path and for fixing said positions with reference to said indicator so that subsequent work pieces may be machined without reference to the micrometer dial; the provision of an indicator for a machine tool including a member adapted to be moved in proportion to the movement of means within the machine tool, a fixed element, and a dial adapted to be rotated with, and independently of the member; and the provision of an indicator for a machine tool including a member for supporting a plurality of adjustable clips, which member is adapted to be rotated in proportion to the movement of an element of the machine tool, and a dial adapted to be rotated with, and independently of said member.

The above, other objects and novel features of the invention will become apparent from the following specification and accompanying drawings, in which.

Figure 1:
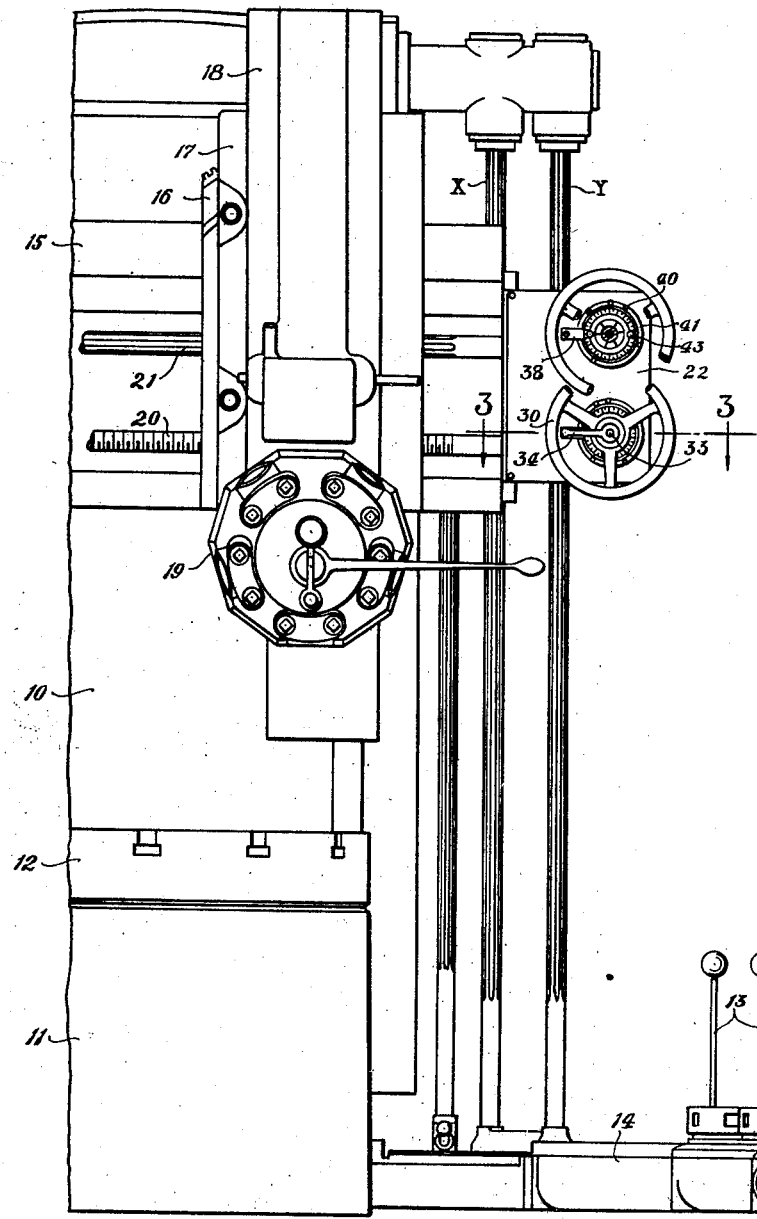
Figure 1 is a front elevational view of a portion of a vertical turret lathe to which the principles of this invention have been applied.

Referring to the drawings, and particularly to Figure 1, the invention is shown as applied to a vertical turret lathe of the type disclosed in application Serial No. 345,772, filed July 16, 1940, in the names of Edward P. Bullard III et al. The lathe includes a standard 10 to the bottom portion of which a base 11 is integrally attached. A work-supporting table 12 is mounted on, and is suitably journaled in bearings within the base 11. The table 12 is adapted to be rotated by a head-stock transmission (not shown) that is located in the lower portion of the standard 10. The work-supporting table 12 is adapted to be rotated by the head-stock transmission at a plurality of different speeds depending upon the position of a pair of gear shift levers 13 mounted in the forward end of a housing 14 that communicates with said transmission.

A horizontally disposed cross-rail 15 is attached to the standard 10 and is adapted to support a saddle 16 on which a swivel 17 is mounted. The swivel 17 is provided with bearings for receiving a slide member 18, to the lower end of which is journaled a turret 19 that is adapted to support a plurality of metal-working tools.

The turret 19 as well as the swivel 17 and the saddle 16 are adapted to be moved along a horizontal path by the rotation of a horizontally disposed screw 20. The turret 19 and member 18 are adapted to be moved along the bearings in the swivel 17 by the rotation of a splined shaft 21. The splined shaft is adapted to drive a vertically disposed screw that cooperates with the element 18 through suitable gearing.

The head-stock transmission that is located in the lower portion of the standard 10 not only drives the table 12 at a plurality of speeds, but also provides power for rotating the screw 20 and shaft 21 for controlling the movement of the turret 19. A feed-works transmission 22 is mounted on the cross-rail 15 and is adapted to control the rotation of the screw 20 and shaft 21 such that they may be rotated at a plurality of relatively slow speeds and at a substantially constant relatively fast speed. The feed-works transmission 22 is driven from the head-stock transmission through suitable gearing and shafting that drives vertically disposed shafts X and Y.

Figure 3:
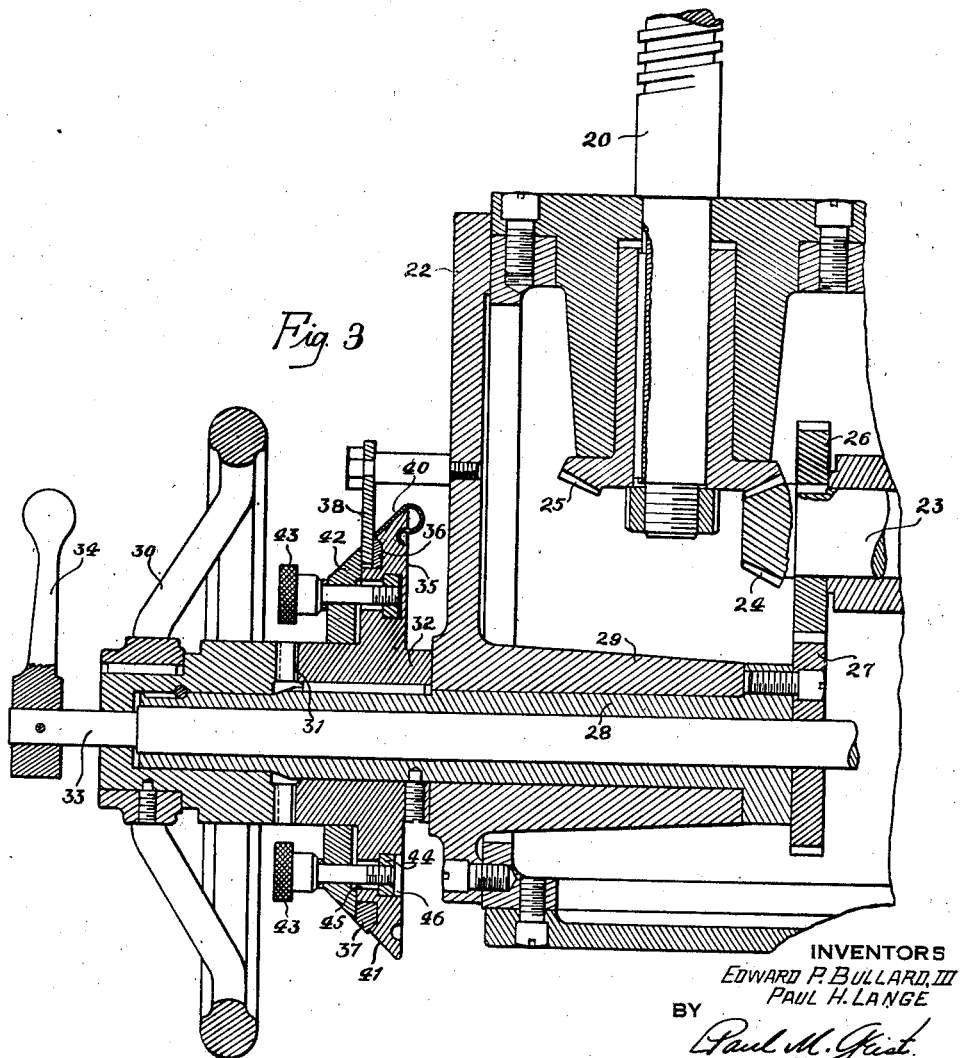
Figure 3 is a sectional plan view taken substantially along the line, 3—3 Figure 1.

Referring to Figure 3, the feed-works transmission 22 includes a driven shaft 23 on which a bevel gear 24 is mounted that meshes with a bevel gear 25 fixed to the screw 20. A spur gear 26 is likewise fixed to the drive shaft 23. It meshes with a spur gear 27 that is fixed to a sleeve 28 journaled in a bearing 29 of the housing for the feed-works transmission 22. The outer end of the sleeve 28 is provided with a hand wheel 30 that is adapted to be clutched to, or disengaged from the sleeve 28 by a clutch 31 and a driving element 32 that is keyed to the sleeve 28. A rod 33 extends longitudinally through the sleeve 28 and is provided with a handle 34 at its outer end for actuating the clutches of the feed-works transmission 22.

Figure 2:
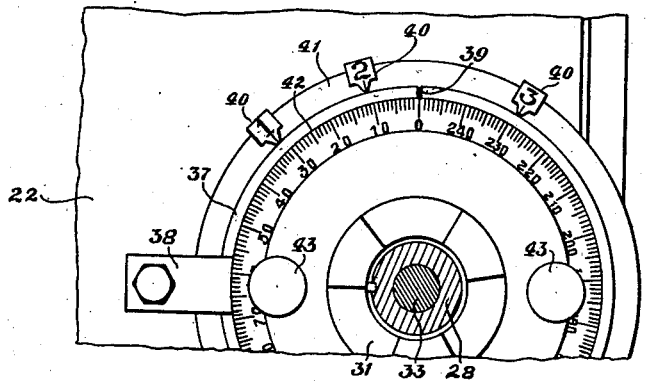
Figure 2 is an enlarged front elevational view of the indicator dial shown in Figure 1.

The driving element 32 is provided with an integral disc portion 35 having a recessed portion 36 for receiving an annular index member 37. The member 37 is stationarily supported by an arm 38 rigidly secured to the housing of the feed-works transmission 22. The member 37 is provided with a single datum 39, Fig. 2, with which a plurality of spring clips 40 cooperate that are slidably mounted on a bevel surface 41 of the disc 35.

A micrometer dial 42 is journaled on the member 32 in cooperative position with the disc 35 and the stationary index 37. The micrometer dial 42 is adapted to be rotated with, and independently of disc 35. It is adapted to be fixed to the disc 35 by a pair of hand screws 43 that engage locking nuts 44 within a T-shaped annular slot 45 of the disc 35. The nuts 44 are inserted within the T-shaped slot 45 through an aperture 46 that communicates therewith. It is apparent that upon loosening the hand screws 43, the micrometer dial 42 may be rotated independently of both the disc 35 and the stationary index 37, and upon tightening said screws, the micrometer dial 42 will rotate with the disc 35.

Rotation of the screw 20 either by the drive shaft 23 of the feed-works 22, or by the rotation of the hand wheel 30 will cause horizontal movement of tool-supporting turret 19 across the rotatable work-supporting table 12. When a plurality of operations are adapted to be performed on work on table 12, the turret 19 is adapted to be moved into starting position with respect to said work. This may be done by turning the hand wheel 30 or operating the drive shaft 23. In each instance, however, the micrometer dial 42 and disc 35 rotate. When the tool in the turret 19 arrives at the starting point for the first operation, clip #1 is mounted on the disc 35 in line with the fixed datum 39, and the operation is performed. The reading on the micrometer dial 42, with respect to the datum 39, may be anything from zero to 250—the number of divisions on the micrometer dial 42.

Assuming that the head 19 is then to be moved a definite distance to the right as viewed in Fig. 1, to perform the second operation on the work, the operator need simply loosen the hand screws 43 and rotate the micrometer dial 42 relatively to both the disc 35 and stationary index 37 until the zero on the micrometer dial is aligned with the datum 39, at which time the hand screws 43 may be tightened. The turret 19 may then be moved the desired distance to the right by turning the hand wheel 30 in a clockwise direction, and with it the micrometer dial 42 and disc 35, as many complete revolutions as there are whole multiples of .250 of an inch in the desired dimension, and an additional part of a revolution until the number on the micrometer dial between zero and 250 that is left after subtracting the whole multiples of .250 of an inch from the desired dimension becomes aligned with the fixed datum 39, whereupon clip #2 is mounted on the disc 35 in line with the fixed datum 39.

Assuming that the turret 19 is to be moved to the left as viewed in Fig. 1 to perform the third operation, the operator need only loosen the hand screws 43 and rotate the micrometer dial 42 relatively to both the disc 35 and the stationary index 37 until the number within 250 that is left after subtracting the whole multiples of .250 of an inch from the dimension for the third operation is aligned with the fixed datum 39, at which time the hand screws 43 may be tightened. The operator may then rotate the hand wheel 30 in a counter-clockwise direction until the zero on the micrometer dial becomes aligned with the datum 39 and additionally as many complete revolutions as there are whole multiples of .250 of an inch in the desired dimension, at which time clip #3 is mounted on the disc 35 in line with the datum 39. Of course, the number of clips 40 that are used depends upon the number of different operations to be performed on the work.

An identical indicator is provided for the splined shaft 21, and it is employed in the same manner as the one just described, for measuring the vertical movement of the turret 19.

The clips 40 which have been set on the disc 35 of each indicator may then be used on any number of work pieces for obtaining the proper dimensions thereof, without reference to the micrometer dial 42, and regardless of the number of times the dial 42 is moved in relation to the disc 35.

Although the principles of the invention have been shown and described as applied to a single embodiment of the invention, it is apparent that numerous features may be used without others, without departing from the principles of the invention.

What is claimed is:

1. An indicator for a machine tool comprising in combination, stationary means provided with a fixed datum; means adapted to be rotated in response to movement of a member of said machine tool; a graduated dial rotatable with and relatively to said rotatable means and a plurality of clips adapted adjustably to be supported by said rotatable means independently of said graduated dial, said clips being adapted to cooperate with said fixed datum and their adjustment to be facilitated by said graduated dial.

2. Apparatus for facilitating the rapid machining of a plurality of work pieces on each of which a substantially identical series of machining operations are to be performed, comprising in combination stationary means provided with a fixed datum; means for supporting a plurality of adjustable clips adapted to cooperate with said datum for locating the starting point of each operation; and means for determining the distance between each of said clips comprising a micrometer dial adapted to be rotated with and relatively to said clip-supporting means.

3. An indicator for a machine tool comprising in combination, a disc adapted to be rotated an amount proportional to the movement imparted to a member of the machine tool; a graduated disc adapted to be rotated with and relatively to said rotatable disc; a plurality of adjustable clips adapted to be supported by said rotatable disc independently of said graduated disc; and stationary means provided with a fixed datum adapted to cooperate with said adjustable clips and said graduated disc.

4. An indicator for a machine tool comprising in combination, a pair of rotatable dials, one of which is movable with a movable member of the machine tool, and the other of which is adapted to be rotated relatively to, and to be connected to rotate with said movable dial; a plurality of clips adapted to be adjustably supported by one of said dials independently of the other and a series of graduations located on said other; and stationary means provided with a fixed datum adapted to cooperate with the graduations and the clips on said dials.

5. An indicator for a machine tool comprising in combination, stationary means provided with a fixed datum; a rotatable dial having adjustable clips mounted thereon; and a graduated dial adapted to be rotated with, and independently of said rotatable dial.

6. An indicator for a machine tool comprising in combination, a rotatable dial having adjustable clips mounted thereon; a graduated dial adapted to be rotated with, and independently of said rotatable dial; and stationary means located between said dials and provided with a fixed datum.

7. Apparatus for setting a machine tool to perform a plurality of substantially identical operations on duplicate work pieces comprising in combination, stationary means provided with a fixed datum; a rotatable member having means for supporting a plurality of adjustable clips; and a micrometer dial rotatable with and independently of said member.

8. An indicator for a machine tool having means for moving a tool along a rectilinear path comprising in combination, a micrometer dial adapted to be connected to and disconnected from said tool-moving means for measuring, as a direct reading from zero, the distances between a plurality of successive positions to which said tool is adapted to be moved along said rectilinear path; and means for fixing said positions with reference to means that moves in fixed relation to said tool whereby a plurality of work pieces may be subsequently machined without reference to said micrometer dial.

9. An indicator for a machine tool as claimed in claim 8, in which said micrometer dial is adjustable relative to a fixed datum.

10. An indicator for a machine tool as claimed in claim 8 in which the means for fixing said positions includes a member adapted to be moved in proportion to the movement of said tool, and said micrometer is adapted to be connected to, or disconnected from said member.

11. An indicator for a machine tool as claimed in claim 8, in which said micrometer dial is adapted to be connected to, or disconnected from the means for fixing said positions, and the means for fixing said positions comprises a member that moves in proportion to the movement of said tool and is adapted to support a plurality of adjustable clips that cooperate with a fixed datum.

EDWARD P. BULLARD, III.
PAUL H. LANGE.